United States Patent
Iwabuchi et al.

(10) Patent No.: US 11,872,847 B2
(45) Date of Patent: Jan. 16, 2024

(54) TIRE

(71) Applicant: BRIDGESTONE CORPORATION, Tokyo (JP)

(72) Inventors: Sotaro Iwabuchi, Tokyo (JP); Yusaku Ishiguro, Tokyo (JP); Hikaru Inagaki, Tokyo (JP); Keiichi Kato, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 292 days.

(21) Appl. No.: 17/057,107

(22) PCT Filed: Jun. 7, 2019

(86) PCT No.: PCT/JP2019/022809
§ 371 (c)(1),
(2) Date: Nov. 20, 2020

(87) PCT Pub. No.: WO2019/244682
PCT Pub. Date: Dec. 26, 2019

(65) Prior Publication Data
US 2021/0197623 A1    Jul. 1, 2021

(30) Foreign Application Priority Data
Jun. 21, 2018 (JP) ................................ 2018-118162

(51) Int. Cl.
*B60C 11/13*    (2006.01)
*B60C 11/03*    (2006.01)

(52) U.S. Cl.
CPC ...... *B60C 11/1353* (2013.01); *B60C 11/0302* (2013.01); *B60C 11/1307* (2013.01);
(Continued)

(58) Field of Classification Search
CPC ......... B60C 11/1353; B60C 2011/1361; B60C 2011/1338; B60C 11/13
See application file for complete search history.

(56) References Cited

U.S. PATENT DOCUMENTS 5,158,626 A * 10/1992 Himuro ............... B60C 11/0302
152/209.28
7,497,240 B2 * 3/2009 Zimmer ................. B60C 11/13
152/209.19
(Continued)

FOREIGN PATENT DOCUMENTS

CN    1118589 A    3/1996
CN    102398485 A    4/2012
(Continued)

OTHER PUBLICATIONS

International Search Report issued in International Application No. PCT/JP2019/022809 dated Sep. 10, 2019.
(Continued)

*Primary Examiner* — Cedrick S Williams
*Assistant Examiner* — Thomas Frank Schneider
(74) *Attorney, Agent, or Firm* — SOLARIS Intellectual Property Group, PLLC.

(57) ABSTRACT

A tire includes a circumferential direction groove and plural protrusions. The circumferential direction groove is formed in a tread face so as to open toward an outer side in a tire radial direction. The plural protrusions are formed so as to project to a projection height of from 0.1 mm to 1.0 mm from a groove bottom face or a groove side face of the circumferential direction groove, and are spaced apart by a spacing of from 0.1 mm to 1.0 mm. A center line MA, MB linking a center point of a leading end side with a center point of a base end side of each of the plural protrusions leans with respect to a perpendicular line HA, HB such that the leading end side of the protrusion is positioned further toward a tire rotation direction upstream side than the base end side of the protrusion when viewed along a tire width direction or the tire radial direction.

3 Claims, 11 Drawing Sheets

(52) U.S. Cl.
CPC .............. *B60C 2011/0341* (2013.01); *B60C 2011/1338* (2013.01); *B60C 2011/1361* (2013.01)

(56) References Cited

U.S. PATENT DOCUMENTS

| | | |
|---|---|---|
| 9,517,660 B1 | 12/2016 | Boren |
| 2001/0032691 A1* | 10/2001 | Ohsawa .............. B60C 11/13 152/209.18 |
| 2008/0149242 A1* | 6/2008 | Oyama .............. B60C 11/047 152/209.19 |
| 2013/0180638 A1 | 7/2013 | Washizuka |
| 2016/0016439 A1 | 1/2016 | Miyazano |
| 2017/0072749 A1 | 3/2017 | Muhlohff et al. |
| 2018/0141390 A1 | 5/2018 | Miyasaka et al. |

FOREIGN PATENT DOCUMENTS

| | | |
|---|---|---|
| CN | 103204033 A | 7/2013 |
| EP | 2540525 A1 | 2/2013 |
| EP | 2871072 A1 | 5/2015 |
| EP | 3296129 A1 | 3/2018 |
| JP | H06-239108 A | 8/1994 |
| JP | 2000-247111 A | 9/2000 |
| JP | 2002-19420 A | 1/2002 |
| JP | 2002-219906 A | 8/2002 |
| JP | 2002-225510 A | 8/2002 |
| JP | 2004-196145 A | 7/2004 |
| JP | 2010052698 A * | 3/2010 |
| JP | 2012-035684 A | 2/2012 |
| JP | 2012-101745 A | 5/2012 |
| JP | 2013-147231 A | 8/2013 |
| JP | 2013-169809 A | 9/2013 |
| JP | 2014-94645 A | 5/2014 |
| JP | 2016-215698 A | 12/2016 |
| KR | 100812049 B1 | 3/2008 |
| KR | 2012-0094772 A | 8/2012 |
| WO | 95/18022 A1 | 7/1995 |
| WO | 2008/122456 A1 | 10/2008 |
| WO | 2011/102264 A1 | 8/2011 |
| WO | 2015/135928 A1 | 9/2015 |
| WO | 2016/182076 A1 | 11/2016 |

OTHER PUBLICATIONS

Extended European Search Report dated Feb. 8, 2022 issued in corresponding EP Patent Application No. 19823358.7.
Search Report of the Chinese office action dated May 23, 2022, from the SIPO in a Chinese patent application No. 201980041237.5 corresponding to the instant patent application.

* cited by examiner

TIRE

TECHNICAL FIELD

The present disclosure relates to a tire formed with fine protrusions on a groove on an outer surface of the tire.

BACKGROUND ART

Hitherto, fine protrusions formed on an outer surface of a tire have been used to form contrasting pattern regions. For example, International Publication (WO) No. 2016/182076 discloses technology in which a pattern region is formed on an outer surface of a tire, with plural unit patterns being formed within this pattern region. WO No. 2015/135928 discloses technology in which fine protrusions are formed at a groove bottom.

SUMMARY OF INVENTION

Technical Problem

In tires in which fine protrusions are formed in a groove in order to increase the contrast between the tread face (outer surface) and the groove, the groove serves to drain water when running over a wet road surface. However, in tires in which fine protrusions are formed in a groove in the tread face as in WO No. 2015/135928, the flow of water is suppressed due to the water contacting the fine protrusions in the groove, which might be detrimental to water drainage from the groove. Namely, such tires have room for improvement with respect to increasing the contrast between the tread face and the groove, while suppressing detriment to water drainage from the groove.

An object of the present disclosure is to increase contrast between a tread face and a groove of a tire, while also suppressing detriment to water drainage from the groove.

Solution to Problem

A tire according to the present disclosure includes a groove that is formed in a tread face so as to open toward an outer side in a tire radial direction, and plural protrusions that are formed on a surface of the groove so as to project to a projection height of from 0.1 mm to 1.0 mm at a spacing of from 0.1 mm to 1.0 mm, a center line linking a center point of a leading end side with a center point of a base end side of the respective protrusions leaning with respect to a perpendicular line orthogonal to a surface of the groove, such that the leading end side of the each protrusion is positioned further toward a tire rotation direction upstream side than the base end side of the protrusion when viewed along a tire width direction or the tire radial direction.

In the tire according to the present disclosure, the fine protrusions are formed in the groove, thereby enabling the contrast between the tread face and the groove to be increased. Moreover, when running over a wet road surface, water flows inside the groove from an upstream side toward a downstream side in the opposite directions as the tire rotation direction. Some of the water flowing inside the groove flows toward the protrusions projecting from the surface of the groove. Note that the center line linking the center point of the leading end side and the center point of the base end side of the respective protrusions leans with respect to the perpendicular line orthogonal to the groove surface such that the leading end side of the protrusion is positioned further toward the tire rotation direction upstream side than the base end side of the protrusion.

In other words, the leading end side of the protrusion is positioned further toward the downstream side than the base end side of the protrusion in the direction in which water flows. Thus, the flow of water is better suppressed from backing up behind a portion of the protrusion at the upstream side of the center line than it would be in configurations in which the leading end side and the base end side of the protrusion are aligned along the perpendicular line orthogonal to the groove surface, or configurations in which the leading end side of the protrusion is positioned further toward the upstream side than the base end side thereof in the direction in which water flows. The tire is thus capable of increasing the contrast between the tread face and the groove while also suppressing any detriment to water drainage from the groove.

Advantageous Effects of Invention

The tire of the present disclosure is capable of increasing the contrast between the tread face and the groove while also suppressing any detriment to water drainage from the groove.

DESCRIPTION OF EMBODIMENTS

First Exemplary Embodiment

Explanation follows regarding a tire 10 according to a first exemplary embodiment, as an example of the present disclosure. The tire 10 is primarily intended for use in passenger cars. Note that the tire 10 is not limited to a tire employed in a passenger car, and may be a tire employed for other purposes. For example, the tire 10 may be employed as a tire for a light truck, an aircraft, or a construction vehicle. In each of the drawings, the arrow C indicates a tire rotation direction (tire circumferential direction), the arrow R indicates a tire radial direction, and the arrow W indicates a tire width direction, this being a direction running parallel to a rotation axis of the tire 10. In the following explanation, the tire rotation direction is referred to as the C direction, the tire radial direction is referred to as the R direction, and the tire width direction is referred to as the W direction.

Figure 1:
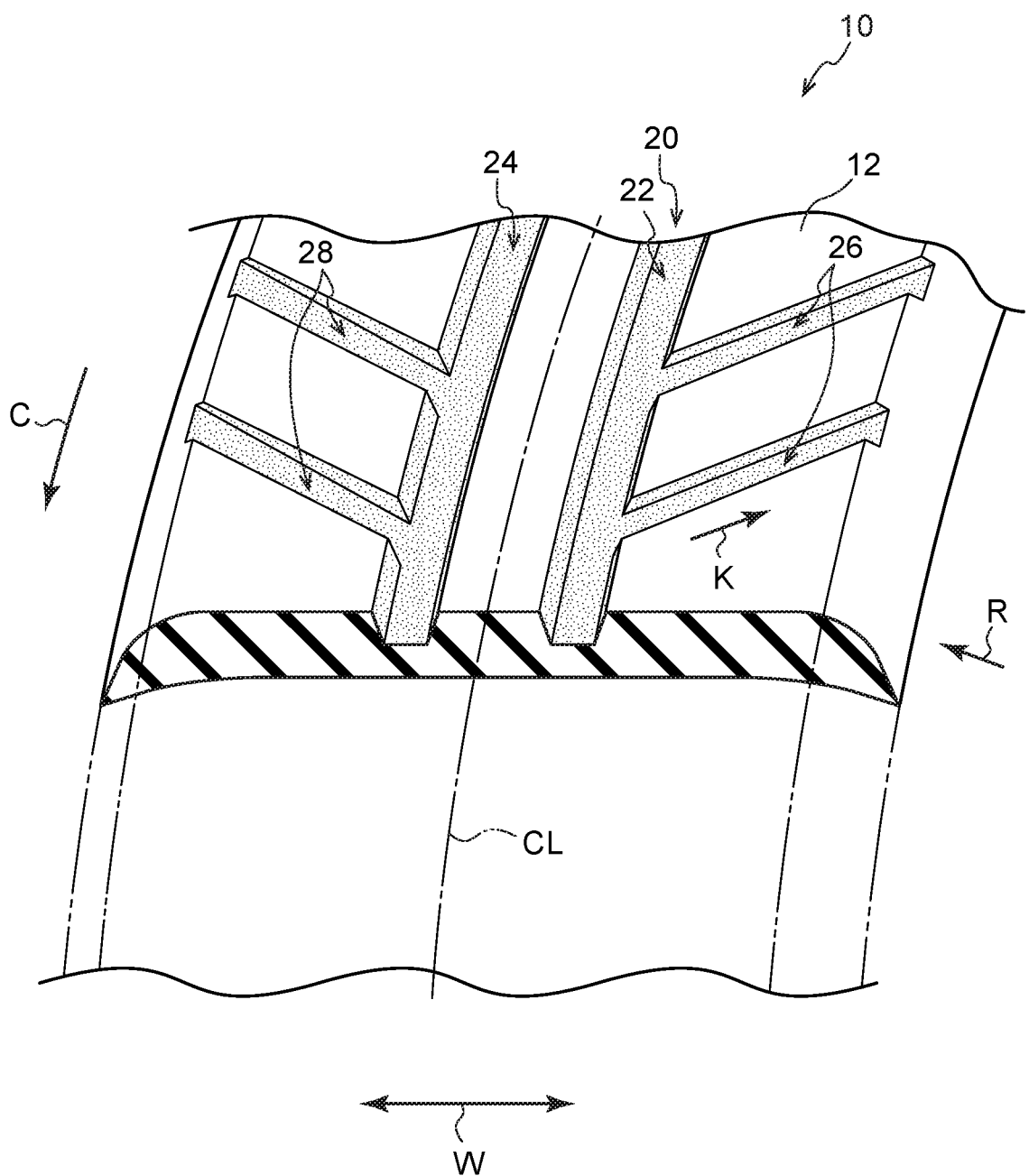
FIG. 1 is a perspective view illustrating circumferential direction grooves and lateral grooves of a tire according to a first exemplary embodiment.

The single-dotted dashed line CL in FIG. 1 indicates an equatorial plane of the tire 10. In the present exemplary embodiment, a W direction side nearer to the tire equatorial plane CL is referred to as the W direction inside, and a W direction side further from the tire equatorial plane CL is referred to as the W direction outside. Note that the internal structure of the tire 10 may be an internal structure similar to an internal structure of a conventional pneumatic tire. Explanation regarding the internal structure of the tire 10 is therefore omitted.

Figure 2A:
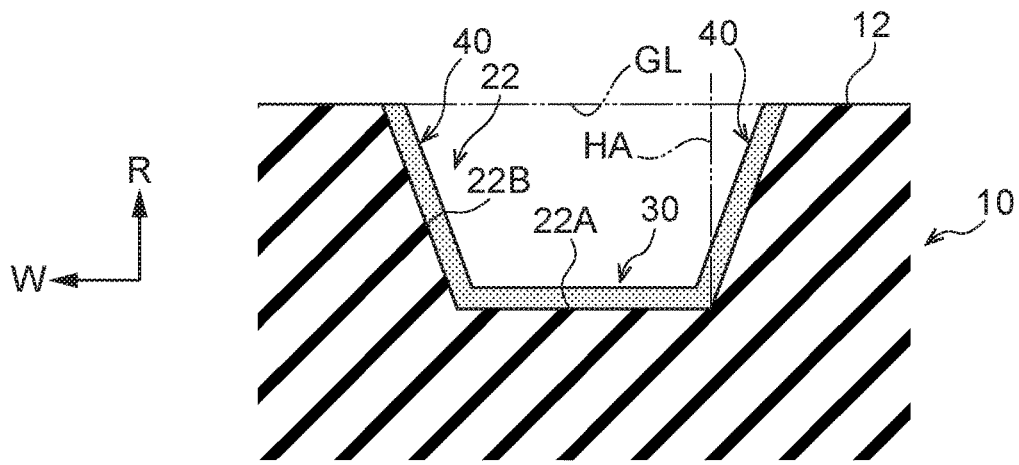
FIG. 2A is a vertical cross-section of a circumferential direction groove of a tire according to the first exemplary embodiment.

As illustrated in FIG. 1, the tire 10 includes a tread face 12 serving as an outer surface configuring a ground contact face that contacts a road surface GL (see FIG. 2A). The tread face 12 is formed with a groove portion 20, serving as an example of a groove open toward the R direction outside (set back from the tread face 12 in the R direction). The groove portion 20 is formed with plural protrusions 32 (see FIG. 3A) and plural protrusions 42 (see FIG. 4A), described later. In other words, the tire 10 includes the groove portion 20, the plural protrusions 32, and the plural protrusions 42.

Groove Portion

As an example, the groove portion 20 includes circumferential direction grooves (rib grooves) 22, 24 extending in the C direction, and plural lateral grooves (lug grooves) 26, 28 that extend from the circumferential direction groove 22 along an intersecting direction that intersects the C direction as viewed along the R direction. This intersecting direction is hereafter referred to as the K direction. A K direction side that is closer to the circumferential direction grooves 22, 24 is referred to as an upstream side (rear side), and a K direction side that is further from the circumferential direction grooves 22, 24 is referred to as a downstream side (front side). As an example, the lateral grooves 26, 28 are disposed at an incline such that the K direction upstream side is positioned further downstream in the C direction than the K direction downstream side.

As an example, the circumferential direction groove 22 and the plural lateral grooves 26, and the circumferential direction groove 24 and the plural lateral grooves 28, are formed symmetrically to each other on one and the other W direction sides of the tire equatorial plane CL. Explanation will therefore be given regarding the circumferential direction groove 22 and the plural lateral grooves 26, and explanation regarding the circumferential direction groove 24 and the plural lateral grooves 28 will be omitted. Moreover, since the plural lateral grooves 26 are configured similarly to one another, explanation will be given regarding one of the lateral grooves 26, and explanation regarding the other lateral grooves 26 will basically be omitted.

Circumferential Direction Groove

The circumferential direction groove 22 extends in a straight line in the C direction. As an example, the circumferential direction groove 22 is formed with an inverted trapezoidal shaped cross-section profile when viewed in cross-section sectioned orthogonally to a groove length direction.

As illustrated in FIG. 2A, when viewed in cross-section sectioned orthogonally to the groove length direction, the circumferential direction groove 22 includes a single groove bottom face 22A extending in the W direction, and two groove side faces 22B respectively extending toward the R direction outside from the two W direction ends of the groove bottom face 22A. The groove bottom face 22A and the groove side faces 22B configure an example of a groove surface. The groove side faces 22B are inclined with respect to an imaginary perpendicular line HA that is orthogonal to the groove bottom face 22A. A first protruding portion 30 is formed to the groove bottom face 22A. Second protruding portions 40 are formed to the groove side faces 22B.

First Protruding Portion

Figure 3A:
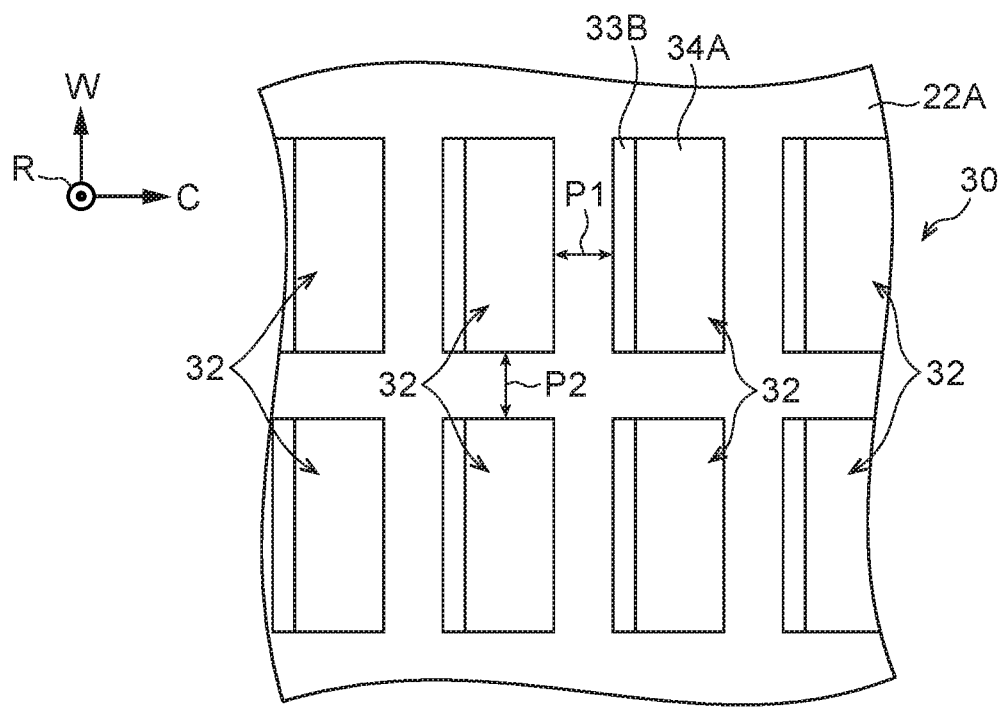
FIG. 3A is an explanatory diagram illustrating plural protrusions on a side face of a circumferential direction groove according to the first exemplary embodiment.

As illustrated in FIG. 3A, the first protruding portion 30 includes the plural protrusions 32. The plural protrusions 32 project out from the groove bottom face 22A in the R direction. As an example, each of the plural protrusions 32 is formed in a rectangular shape with its short direction in the C direction and its long direction in the W direction as viewed along the R direction. The plural protrusions 32 are arranged in a matrix pattern on the groove bottom face 22A so as to be spaced apart by a spacing P1 in the C direction and by a spacing P2 in the W direction.

A projection height of the plural protrusions 32 in the R direction is a predetermined length of from 0.1 mm to 1.0 mm. Namely, the plural protrusions 32 are fine protrusions. In cases in which the projection height is less than 0.1 mm, it becomes difficult to mold the protrusions 32, and there is a concern that it might not be possible to attenuate light incident thereto sufficiently to lower the brightness to a degree that appears black. By making the projection height no greater than 1.0 mm, the local difference between rigidity at the protrusions 32 and rigidity in the surroundings of the protrusions 32 is small, thereby suppressing a localized concentration of stress.

The spacing P1 and the spacing P2 between the plural protrusions 32 are both a predetermined length of from 0.1 mm to 1.0 mm. In cases in which either of the spacings P1 or P2 is less than 0.1 mm, it becomes difficult to mold the plural protrusions 32. In cases in which either of the spacings P1 or P2 is greater than 1.0 mm, it might not be possible to attenuate light incident thereto sufficiently to lower the brightness to a degree that appears black. As an example, in the present exemplary embodiment, the projection heights and the spacing dimensions of the respective protrusions may be measured using a VR-3000 series one-shot 3D measuring macroscope, manufactured by Keyence Corporation. As an example, in the present exemplary embodiment, the brightness may be measured by a handheld spectrophotometer manufactured by Nippon Denshoku Industries Co. (Ltd).

Figure 3B:
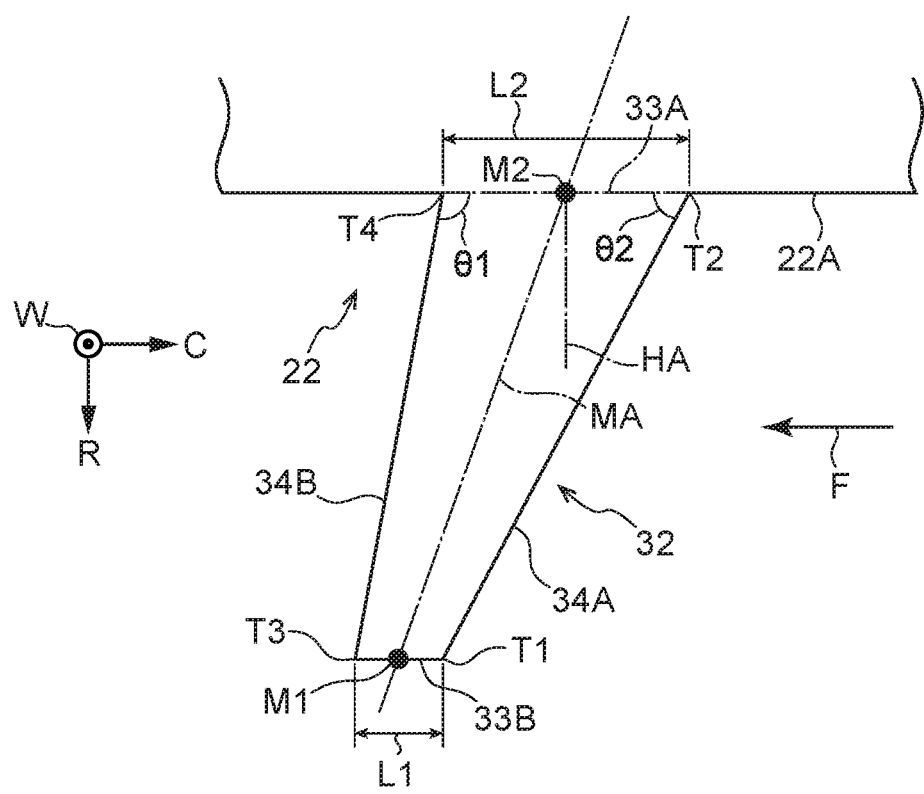
FIG. 3B is an enlarged explanatory diagram illustrating a single protrusion on a side face of a circumferential direction groove according to the first exemplary embodiment.

FIG. 3B illustrates one of the protrusions 32 in a state opposing the road surface GL in the R direction when part of the tread face 12 (see FIG. 2A) is in contact with the road surface GL (see FIG. 2A), as viewed along the W direction. The protrusion 32 has a trapezoidal shaped cross-section profile in a C-R plane, and has a three-dimensional cross-section profile extending in the W direction. Specifically, the protrusion 32 has a trapezoidal shaped cross-section profile in which a base end (groove bottom face 22A) side configures a lower trapezoid base 33A, a leading end side configures an upper trapezoid base 33B, and the two base angles (internal angles) at either end of the lower trapezoid base 33A are different sizes to each other. A C direction length L1 of the upper trapezoid base 33B is shorter than a C direction length L2 of the lower trapezoid base 33A.

In this cross-section of the protrusion 32, a first base angle θ1 at the C direction upstream side is an obtuse angle. A second base angle θ2 at the C direction downstream side is an acute angle. In other words, when viewed along the W direction, the protrusion 32 leans such that the leading end side thereof is positioned further toward the C direction upstream side than the base end side thereof. Specifically, a center line MA linking a center point M1 of the upper trapezoid base 33B at the leading end side and a center point M2 of the lower trapezoid base 33A at the base end side leans with respect to the perpendicular line HA.

When viewed along the W direction, a leading edge T1 at a portion of the protrusion 32 further toward the C direction downstream side (rear side) than the center line MA is positioned further toward the C direction upstream side (front side) than a base edge T2 of the protrusion 32. Furthermore, a leading edge T3 at a portion of the protrusion 32 further toward the C direction upstream side than the center line MA is positioned further toward the C direction upstream side than a base edge T4 of the protrusion 32. In the present application, the terms "leading edge" and "leading ends" are used interchangeably and are to be treated as equivalents.

In addition thereto, an inclined face 34A that is inclined such that a leading edge T1 side thereof is positioned further toward the C direction downstream side than a base end T2 side thereof is formed at the C direction downstream side of the center line MA of the protrusion 32. Note that the C direction and the direction in which water (not illustrated in the drawings) flows inside the circumferential direction groove 22 (indicated by the arrow F) are the opposite directions. Thus, expressed in terms of an F direction, namely a direction in which water flows, the inclined face 34A is inclined such that the leading edge T1 side is positioned further toward an F direction downstream side than the base end T2 side. Furthermore, an inclined face 34B that is inclined such that a leading edge T3 side thereof is positioned further toward the C direction upstream side than a base edge T4 side thereof is formed at the C direction upstream side of the center line MA of the protrusion 32.

An incline angle of the inclined face 34A with respect to the groove bottom face 22A is gentler than an incline angle of the inclined face 34B with respect to the groove bottom face 22A. The inclined face 34A thereby has a function of guiding water flowing toward the inclined face 34A toward the downstream side. The incline angle of the inclined face 34B is steeper than the incline angle of the inclined face 34A. The inclined face 34B thereby has a function of restricting water that has flowed over the inclined face 34A toward the inclined face 34B side from flowing back toward the inclined face 34A side.

Second Protruding Portion

Figure 4A:
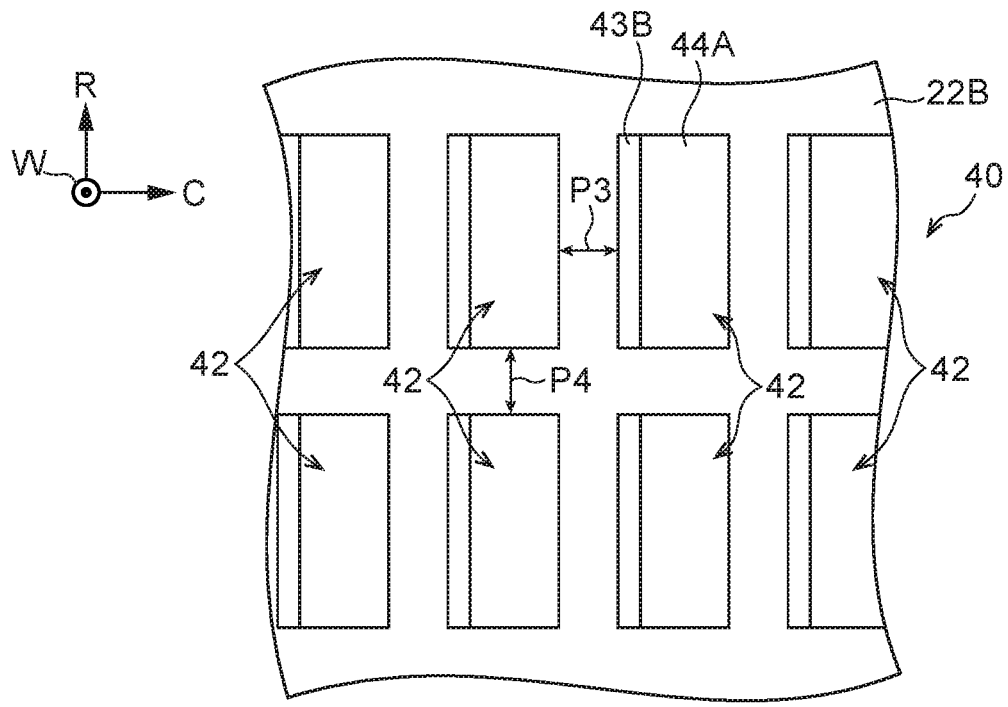
FIG. 4A is an explanatory diagram illustrating plural protrusions on a bottom face of a circumferential direction groove according to the first exemplary embodiment.

As illustrated in FIG. 4A, each of the second protruding portions 40 includes the plural protrusions 42. The plural protrusions 42 project out from the groove side faces 22B in the W direction. As an example, each of the plural protrusions 42 is formed in a rectangular shape with its short direction along the C direction and its long direction along the R direction when viewed along the W direction. The plural protrusions 42 are arranged in a matrix pattern on each of the groove side faces 22B so as to be spaced apart by a spacing P3 in the C direction and by a spacing P4 in the R direction. Note that a W direction projection height of the plural protrusions 42 is the same as the projection height of the plural protrusions 32 (see FIG. 3A). Similarly, the spacings P3, P4 between the plural protrusions 42 employ the same values as the spacings P1, P2 between the plural protrusions 32 (see FIG. 3A). Namely, the plural protrusions 42 are fine protrusions.

Figure 4B:
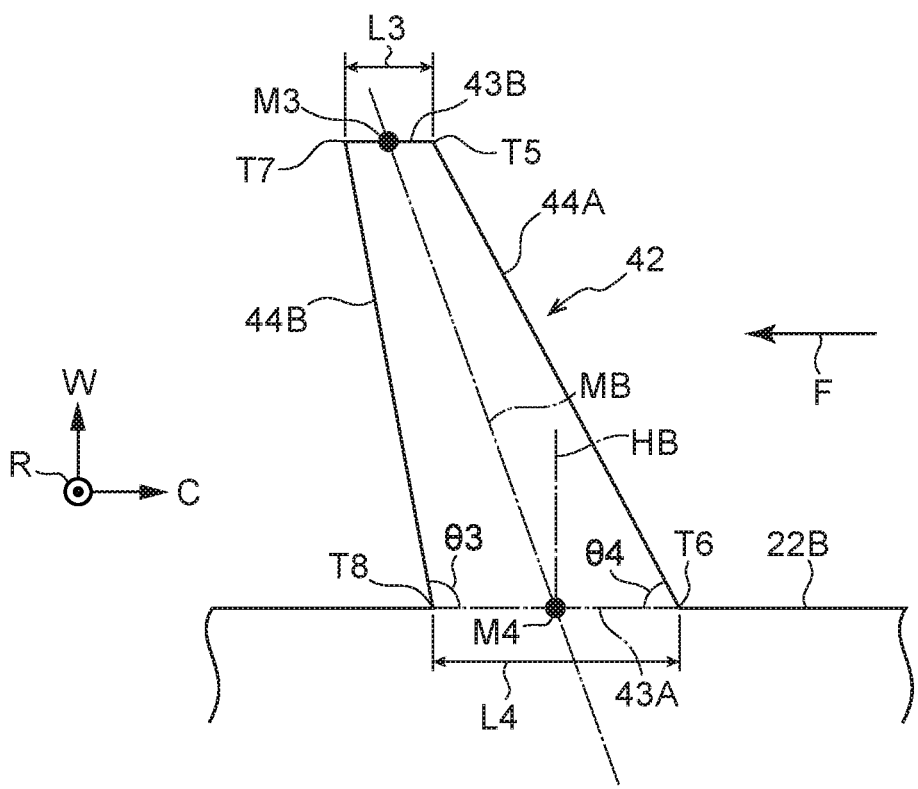
FIG. 4B is an enlarged explanatory diagram illustrating a single protrusion on a bottom face of a circumferential direction groove according to the first exemplary embodiment.

When viewed along the R direction, the protrusion 42 illustrated in FIG. 4B has a trapezoidal shaped cross-section profile in a C-W plane, and has a three-dimensional cross-section profile extending along the R direction. Specifically, the protrusion 42 has a trapezoidal shaped cross-section profile in which a base end (groove side face 22B) side configures a lower trapezoid base 43A, a leading end side configures an upper trapezoid base 43B, and the two base angles (internal angles) at either end of the lower trapezoid base 43A are different sizes to each other. A C direction length L3 of the upper trapezoid base 43B is shorter than a C direction length L4 of the lower trapezoid base 43A.

In this cross-section of the protrusion 42, a third base angle θ3 at the C direction upstream side is an obtuse angle. A fourth base angle θ4 at the C direction downstream side is an acute angle. In other words, when viewed along the R direction, the protrusion 42 leans such that the leading end side thereof is positioned further toward the C direction upstream side than the base end side thereof. Specifically, a center line MB linking a center point M3 of the upper trapezoid base 43B at the leading end side and a center point M4 of the lower trapezoid base 43A at the base end side leans with respect to an imaginary perpendicular line HB orthogonal to the corresponding groove side face 22B.

When the protrusion 42 is viewed along the R direction, a leading edge T5 at a portion of the protrusion 42 further toward the C direction downstream side than the center line MB is positioned further toward the C direction upstream side than a base edge T6 of the protrusion 42. Furthermore, a leading edge T7 at a portion of the protrusion 42 further toward the C direction upstream side than the center line MB is positioned further toward the C direction upstream side than a base edge T8 of the protrusion 42.

In addition thereto, an inclined face 44A that is inclined such that a leading edge T5 side thereof is positioned further toward the C direction upstream side than a base end T6 side thereof is formed at the C direction downstream side of the center line MB of the protrusion 42. Furthermore, an inclined face 44B that is inclined such that a leading edge T7 side thereof is positioned further toward the C direction upstream side than a base end T8 side thereof is formed at the C direction upstream side of the center line MB of the protrusion 42.

An incline angle of the inclined face 44A with respect to the groove side face 22B is gentler than an incline angle of the inclined face 44B with respect to the groove side face 22B. The inclined face 44A thereby has a function of guiding water flowing toward the inclined face 44A toward the downstream side. The incline angle of the inclined face 44B is steeper than the incline angle of the inclined face 44A. The inclined face 44B thereby has a function of restricting water that has flowed over the inclined face 44A toward the inclined face 44B side from flowing back toward the inclined face 44A side.

In the present exemplary embodiment, as an example, for the protrusions 32 (see FIG. 3A and FIG. 3B) and the protrusions 42, L1=L3, L2=L4, θ1=θ3, and θ2=θ4. Note that these respective lengths and angles may be set to values that differ from each other.

Lateral Groove

Figure 6A:
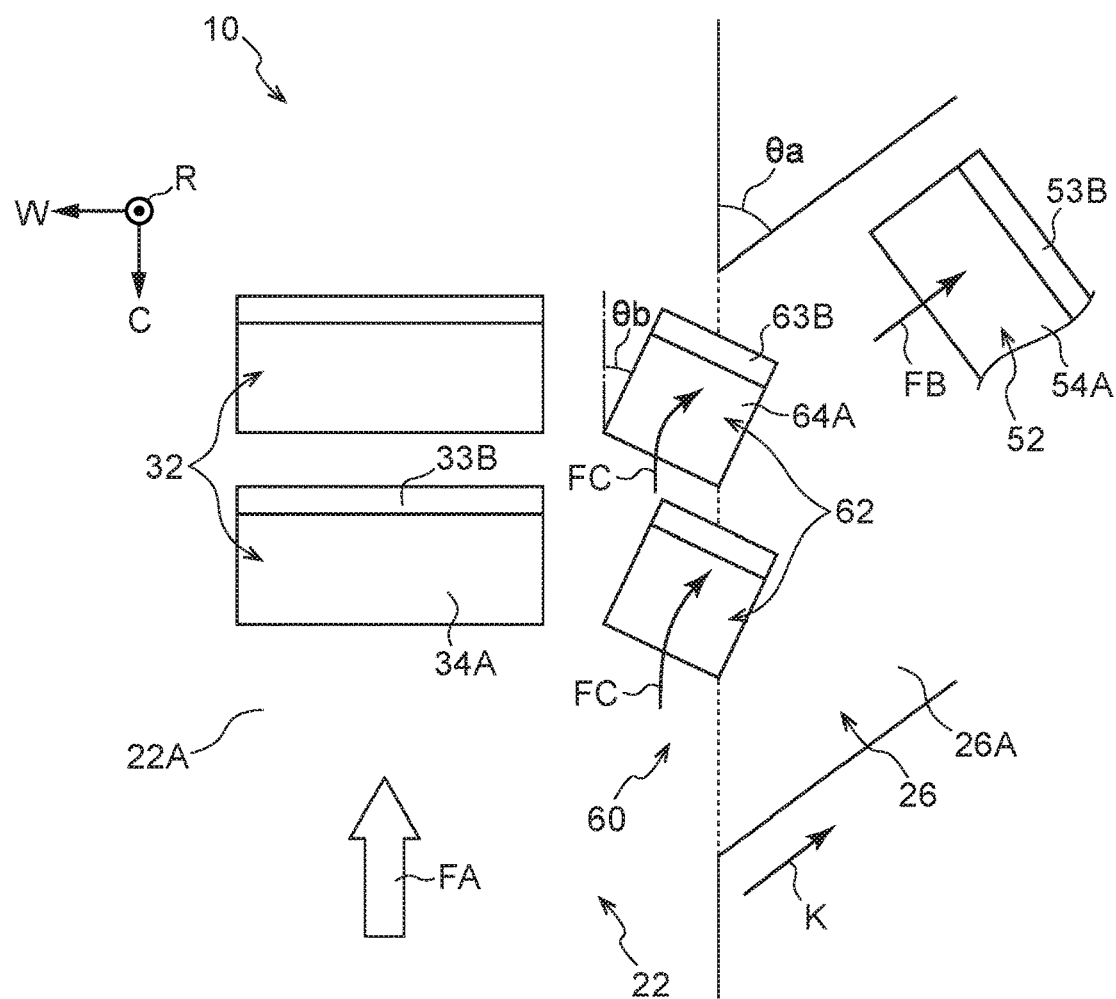
FIG. 6A is an explanatory diagram illustrating a state in which water is guided by a guide face at a connecting portion between a circumferential direction groove and a lateral groove according to the first exemplary embodiment.

The lateral grooves 26 illustrated in FIG. 1 extend in straight lines along the K direction previously described. As an example, an angle θa formed between the circumferential direction groove 22 and each of the lateral grooves 26 (see FIG. 6A) is approximately 60°. Note that the angle θa is not limited to 60°, and may be another angle, excluding 0°. The plural lateral grooves 26 are formed running parallel to each other spaced apart in the C direction, and extend from the circumferential direction groove 22 as far as a W direction outside end of the tread face 12. One end portion (a W direction inside end portion) of each of the plural lateral grooves 26 opens onto the circumferential direction groove 22. As an example, each of the lateral grooves 26 is formed with a quadrilateral cross-section profile when viewed in cross-section sectioned orthogonally to a groove length direction.

Figure 2B:
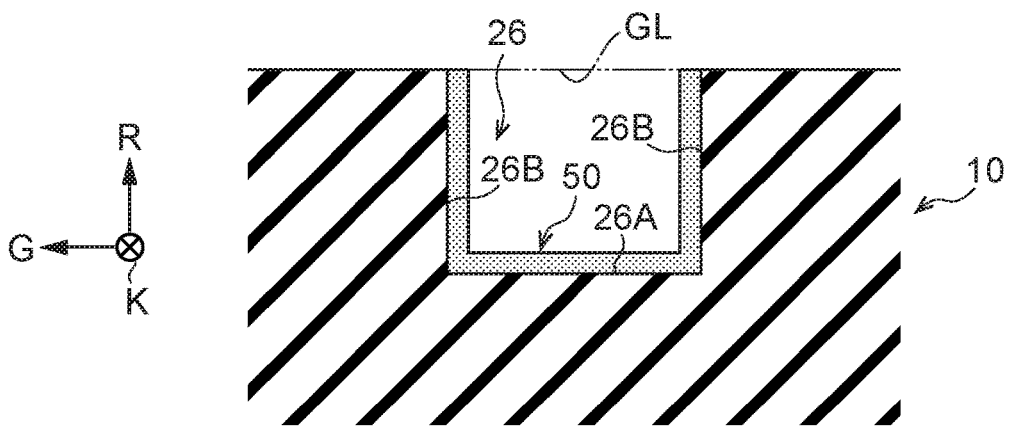
FIG. 2B is a vertical cross-section of a lateral groove of a tire according to the first exemplary embodiment.

As illustrated in FIG. 2B, when viewed in cross-section sectioned orthogonally to the groove length direction, each of the lateral grooves 26 includes a single groove bottom face 26A running along the K direction, and two groove side faces 26B extending from the two C direction ends of the groove bottom face 26A toward the R direction outside. The groove bottom face 26A and the groove side faces 26B configure an example of a groove surface. The groove side faces 26B are stand substantially straight up from the groove bottom face 26A. Third protruding portions 50 are formed to the groove bottom face 26A and the groove side faces 26B.

Note that the third protruding portions 50 formed to the groove side faces 26B and the third protruding portion 50 formed to the groove bottom face 26A each have substantially the same configuration, with the exception that projection directions thereof differ from each other by substantially 90°. Explanation will therefore be given regarding the third protruding portion 50 formed to the groove bottom face 26A, and illustration and explanation of the third protruding portions 50 formed to the groove side faces 26B will be omitted.

Third Protruding Portion

Figure 5A:
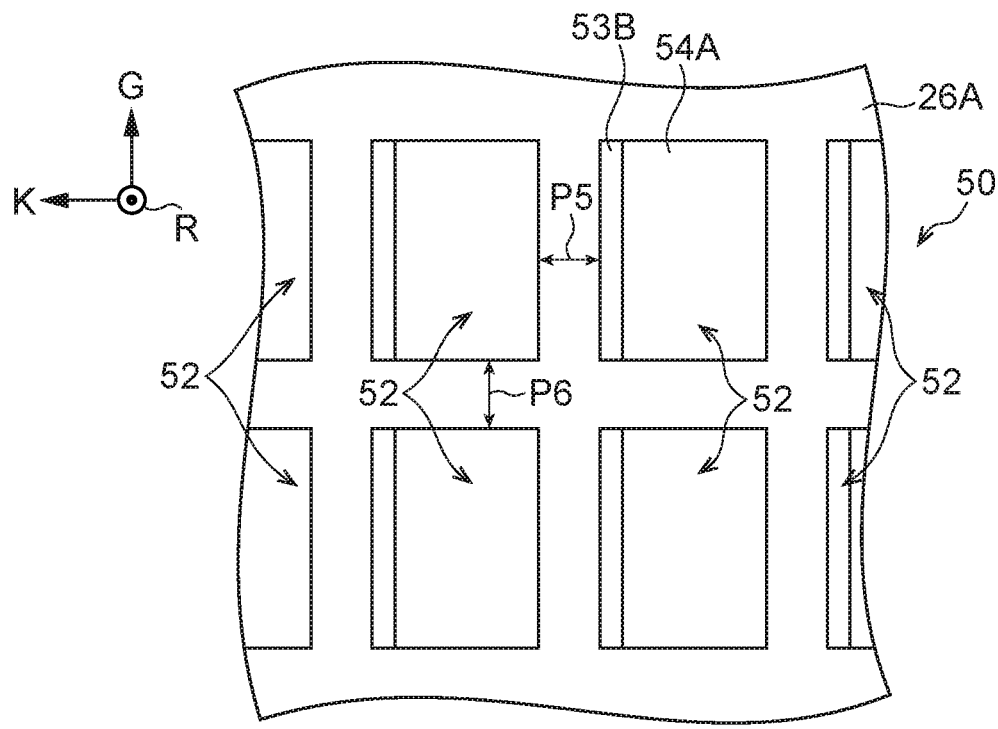
FIG. 5A is an explanatory diagram illustrating plural protrusions on a bottom face of a lateral groove according to the first exemplary embodiment.

As illustrated in FIG. 5A, the third protruding portion 50 includes plural protrusions 52. The plural protrusions 52 project out from the groove bottom face 26A in the R direction. As an example, each of the plural protrusions 52 is formed in a rectangular shape with its long direction along the K direction and its short direction along a direction (hereafter referred to as the G direction) orthogonal to the K direction when viewed along the R direction. The plural protrusions 52 are arranged in a matrix pattern on the groove bottom face 26A so as to be spaced apart by a spacing P5 in the K direction and by a spacing P6 in the G direction.

A projection height of the plural protrusions 52 in the R direction is a predetermined length of from 0.1 mm to 1.0 mm. Namely, the plural protrusions 52 are fine protrusions. In cases in which the projection height is less than 0.1 mm, it becomes difficult to mold the protrusions 52, and there is a concern that it might not be possible to attenuate light incident thereto sufficiently to lower the brightness to a degree that appears black. By making the projection height no greater than 1.0 mm, the local difference between rigidity at the protrusions 52 and rigidity in the surroundings of the protrusions 52 is small, thereby suppressing a localized concentration of stress.

The spacing P5 and the spacing P6 between the plural protrusions 52 are both a predetermined length of from 0.1 mm to 1.0 mm. In cases in which either of the spacings P5 or P6 is less than 0.1 mm, it becomes difficult to mold the plural protrusions 52. In cases in which either of the spacings P5 or P6 is greater than 1.0 mm, it might not be possible to attenuate light incident thereto sufficiently to lower the brightness to a degree that appears black. In the present exemplary embodiment, the projection heights and the spacing dimensions of the respective protrusions may be measured using the 3D measuring macroscope mentioned above.

Figure 5B:
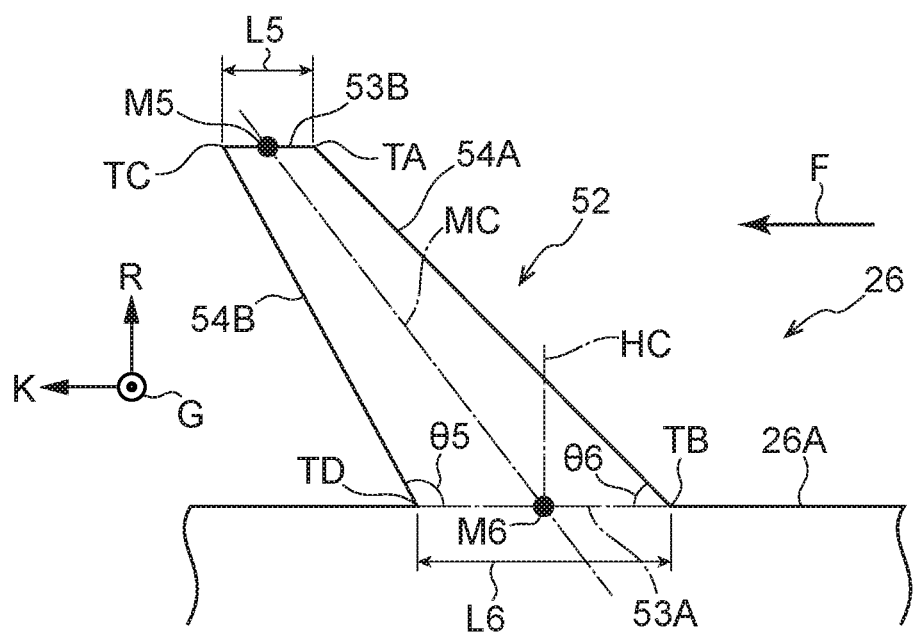
FIG. 5B is an enlarged explanatory diagram illustrating a single protrusion on a bottom face of a lateral groove according to the first exemplary embodiment.

FIG. 5B illustrates one of the protrusions 52 when viewed along the G direction. The protrusion 52 has a trapezoidal shaped cross-section profile in a K-R plane, and has a three-dimensional cross-section profile extending along the G direction. Specifically, the protrusion 52 has a trapezoidal shaped cross-section profile in which a base end (groove bottom face 26A) side configures a lower trapezoid base 53A, a leading end side configures an upper trapezoid base 53B, and the two base angles (internal angles) at either end of the lower trapezoid base 53A are different sizes to each other. A K direction length L5 of the upper trapezoid base 53B is shorter than a K direction length L6 of the lower trapezoid base 53A.

In this cross-section of the protrusion 52, a fifth base angle θ5 at the K direction downstream side is an obtuse angle. A sixth base angle θ6 at the K direction upstream side is an acute angle. In other words, when viewed along the G direction, the protrusion 52 leans such that the leading end side thereof is positioned further toward the K direction downstream side than the base end side thereof. Specifically, a center line MC linking a center point M5 of the upper trapezoid base 53B at the leading end side and a center point M6 of the lower trapezoid base 53A at the base end side leans with respect to an imaginary perpendicular line HC that is orthogonal to the groove bottom face 26A.

When viewing the protrusion 52 along the G direction, a leading edge TA at a portion of the protrusion 52 further toward the K direction upstream side than the center line MC is positioned further toward the K direction downstream side than a base edge TB of the protrusion 52. Furthermore, a leading edge TC at a portion of the protrusion 52 further toward the K direction downstream side than the center line MC is positioned further toward the K direction downstream side than a base edge TD of the protrusion 52.

In addition thereto, an inclined face 54A that is inclined such that a leading edge TA side thereof is positioned further toward the K direction downstream side than a base end TB side thereof is formed at the K direction upstream side of the center line MC of the protrusion 52. Note that the K direction and an F direction in which water flows inside the lateral groove 26 correspond to the same direction. Thus, expressed in terms of the F direction, the inclined face 54A is inclined such that the leading edge TA side thereof is positioned further toward the F direction downstream side than the base edge TB side thereof. Furthermore, an inclined face 54B that is inclined such that a leading edge TC side thereof is positioned further toward the K direction downstream side than a base edge TD side thereof is formed at the K direction downstream side of the center line MC of the protrusion 52.

An incline angle of the inclined face 54A with respect to the groove bottom face 26A is gentler than an incline angle of the inclined face 54B with respect to the groove bottom face 26A. The inclined face 54A thereby has a function of guiding water flowing toward the inclined face 54A toward the F direction downstream side. The incline angle of the inclined face 54B is steeper than the incline angle of the inclined face 54A. The inclined face 54B thereby has a function of restricting water that has flowed over the inclined face 54A toward the inclined face 54B side from flowing back toward the inclined face 54A side.

Furthermore, as an example, the sixth base angle θ6 of the inclined face 54A with respect to the groove bottom face 26A of each of the lateral grooves 26 is smaller than the previously-described second base angle θ2 (see FIG. 3B). Namely, the present exemplary embodiment is configured such that the incline angle of protrusions in grooves with a narrower width is gentler than the incline angle of protrusions in grooves with a wider width. Moreover, as an example, an R direction height of the protrusions 52 is lower than an R direction height of the protrusions 32 (see FIG. 3B). The sixth base angle θ6 is an example of a first incline angle. The second base angle θ2 is an example of a second incline angle.

Connecting Portion

FIG. 6 schematically illustrate a connecting portion 60 between the circumferential direction groove 22 and one of the lateral grooves 26 in an enlarged state. Note that in order to facilitate understanding of the arrangement, only some of the protrusions are illustrated, in an enlarged state. The arrow FA indicates a direction in which water flows inside the circumferential direction groove 22 accompanying rotation of the tire 10 in the C direction. The arrow FB indicates a direction in which water flows inside the lateral groove 26. The arrow FB corresponds to the K direction. The arrows FC indicate the manner and direction in which some of the water flowing inside the circumferential direction groove 22 flows into the lateral groove 26 at the connecting portion 60.

The connecting portion 60 is an example of a connecting location between the circumferential direction groove 22 and the lateral grooves 26. The connecting portion 60 refers to an opening where the lateral groove 26 opens onto the circumferential direction groove 22, and a portion in the vicinity of this opening. Namely, the connecting portion 60 includes part of the circumferential direction groove 22 and part of the lateral groove 26. Plural protrusions 62 are disposed at the connecting portion 60.

As an example, the plural protrusions 62 are formed straddling between the groove bottom face 22A and the groove bottom face 26A. The plural protrusions 62 project out in the R direction from the groove bottom face 22A and the groove bottom face 26A. A projection height of the plural protrusions 62 in the R direction is a predetermined length of from 0.1 mm to 1.0 mm. Namely, the plural protrusions 62 are fine protrusions. As an example, as viewed along the R direction, the plural protrusions 62 have a configuration corresponding to the protrusions 32 if shortened in width in the W direction and turned toward the lateral groove 26 so as to be angled toward the K direction that intersects the C direction. As an example, an angle θb of the plural protrusions 62 with respect to the C direction is smaller than the previously-described angle θa. Note that the R direction height of the protrusions 62 may be higher than the R direction height of the protrusions 32.

Figure 6B:
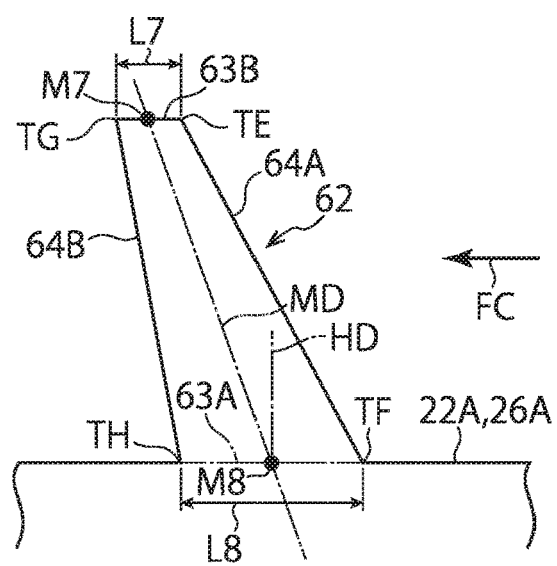
FIG. 6B is an enlarged explanatory diagram illustrating a protrusion at a bond portion according to the first exemplary embodiment.

As illustrated in FIG. 6B, each of the protrusions 62 has a trapezoidal shaped cross-section profile in which a base end (groove bottom face 22A) side configures a lower trapezoid base 63A, a leading end side configures an upper trapezoid base 63B, and the two base angles (internal angles) at either end of the lower trapezoid base 63A are different sizes to each other. A length L7 of the upper trapezoid base 63B is shorter than a length L8 of the lower trapezoid base 63A. The protrusion 62 leans such that its leading end side is positioned closer to the lateral groove 26 (see FIG. 6A) than its base end side. Specifically, a center line MD linking a center point M7 of the upper trapezoid base 63B at the leading end side and a center point M8 of the lower trapezoid base 63A at the base end side leans with respect to an imaginary perpendicular line HD that is orthogonal to the groove bottom face 22A.

When the protrusion 62 is viewed along a direction intersecting both the C direction and W direction (see FIG. 6A), a leading edge TE at a portion of the protrusion 62 further toward the FC direction upstream side than the center line MD is positioned further toward the FC direction downstream side than a base edge TF of the protrusion 62. Furthermore, a leading edge TG at a portion of the protrusion 62 further toward the FC direction downstream side than the center line MD is positioned further toward the FC direction downstream side than a base edge TH of the protrusion 62.

In addition thereto, an inclined face 64A that is inclined such that a leading edge TE side thereof is positioned further toward the FC direction downstream side than a base edge TF side thereof is formed at the FC direction upstream side of the center line MD of the protrusion 62. Furthermore, an inclined face 64B that is inclined such that a leading edge TG side thereof is positioned further toward the FC direction downstream side than a base edge TH side thereof is formed at the FC direction downstream side of the center line MD of the protrusion 62. An incline angle of the inclined face 64A with respect to the groove bottom face 22A is gentler than an incline angle of the inclined face 64B with respect to the groove bottom face 22A. The inclined face 64A is an example of a guide face. The inclined face 64A has a function of guiding some of the water flowing along the circumferential direction groove 22 toward the corresponding lateral groove 26. Note that the inclined face 64A may be configured as a curved face that guides water toward the lateral groove 26.

Operation and Advantageous Effects

Next, explanation follows regarding operation and advantageous effects of the tire 10 according to the first exemplary embodiment, with reference to FIG. 1 to FIG. 6B. Note that reference to individual drawing numbers is omitted.

In the tire 10, the plural fine protrusions 32 are formed to the circumferential direction groove 22, there enabling the contrast between the tread face 12 and the circumferential direction groove 22 to be increased in comparison to configurations in which the plural protrusions 32 are not formed. The tire 10 rotates in the C direction when running over the wet road surface GL. Water flows from upstream side toward the downstream side in the F direction inside the circumferential direction groove 22 where the tire 10 contacts the road surface GL. Some of this water flows toward the plural protrusions 32. Note that the center line MA of each of the protrusions 32 leans such that the leading end side thereof is positioned further toward the F direction downstream side than the base end side thereof. In other words, the leading end side of the protrusion 32 is positioned further toward the F direction downstream side than the base end side of the protrusion 32. Thus, the flow of water in the tire 10 is better suppressed from backing up behind a portion of the protrusion 32 at the upstream side of the center line MA than it would be in configurations in which the leading end side and the base end side of the protrusion 32 are aligned along the perpendicular line HA, or configurations in which the leading end side of the protrusion 32 is positioned further toward the F direction upstream side than the base end side thereof. Thus, the tire 10 in which the fine protrusions 32 are formed in the circumferential direction groove 22 is capable of suppressing any detriment to water drainage from the circumferential direction groove 22.

Note that due to the lean of the center line MA of each of the protrusions 32, a portion of the protrusion 32 at the F direction downstream side of the center line MA covers part of the groove bottom face 22A when viewed along the R direction. This suppresses light reflection by the protrusions 32, making the circumferential direction groove 22 appear closer to black (enabling the contrast between the tread face 12 and the circumferential direction groove 22 to be increased).

The respective protrusions 42 in the circumferential direction groove 22 operate similarly to the protrusions 32 in that the flow of water is suppressed from backing up behind a portion of the protrusion 42 at the upstream side of the center line MB. Thus, the tire 10 formed with the fine protrusions 32 and the protrusions 42 in the circumferential direction groove 22 is capable of suppressing any detriment to water drainage from the circumferential direction groove 22.

Furthermore, in the tire 10, at portions of the respective protrusions 32 both further toward both the C direction upstream side and downstream side than the center line MA, the leading ends (T1, T3) are positioned further toward the C direction upstream side than the corresponding base ends (T2, T4). Thus, at the portion of the protrusion 32 further toward the C direction upstream side than the center line MA, part of the groove bottom face 22A of the circumferential direction groove 22 can be easily covered by the protrusion 32 when viewed from the R direction outside, thereby lowering the brightness comparative to the brightness of other regions where light is simply reflected. Less light is reflected along the R direction than is reflected in directions other than the R direction. Thus, the groove appears black when the circumferential direction groove 22 is viewed from the R direction outside. Namely, the contrast between the tread face 12 and the circumferential direction groove 22 can be increased. Note that the protrusions 42, the protrusions 52, and the protrusions 62 are all capable of obtaining an effect similar to this.

In addition thereto, the inclined face 34A and the inclined face 44A are respectively formed on the F direction upstream side of each of the protrusions 32 and protrusions 42 inside the circumferential direction groove 22 of the tire 10. The inclined face 34A and the inclined face 44A are each inclined such that the leading end side thereof is positioned further toward the F direction downstream side than the base end side thereof. Thus, the flow of water contacting the protrusions 32 and the protrusions 42 is less liable to be suppressed than it would be in configurations in which faces on the F direction upstream sides of the protrusions 32 and the protrusions 42 are uneven faces, thereby enabling any detriment to water drainage from the circumferential direction groove 22 to be suppressed.

In addition to the protrusions 32 and the protrusions 42 formed in the circumferential direction groove 22, the protrusions 52 are formed in the lateral grooves 26 of the tire 10. Since the respective lateral grooves 26 open onto the circumferential direction groove 22, some of the water flowing along inside the circumferential direction groove 22 accompanying rotation of the tire 10 flows from the circumferential direction groove 22 into the lateral grooves 26. However, the lateral grooves 26 extend along the K direction. The water therefore contacts the groove side faces 26B (see FIG. 2B) present on the C direction sides of the lateral grooves 26, partially restricting the flow of water, with the result that water flows into the lateral grooves 26 running along the K direction less readily than it does along the circumferential direction groove 22 running along the C direction.

In the tire 10, the sixth base angle θ6 of the inclined faces 54A inside the lateral grooves 26 is smaller than the second base angle θ2 of the inclined faces 34A inside the circumferential direction groove 22. Water therefore flows over the protrusions 52 more easily than it would in configurations in which θ6>θ2. Water is therefore less liable to pool inside the lateral grooves 26, enabling any detriment to water drainage from the lateral grooves 26 to be suppressed.

In the tire 10, some of the water flowing along the circumferential direction groove 22 contacts the inclined faces 64A at the connecting portions 60 between the circumferential direction groove 22 and the lateral grooves 26, such that this water is guided into the lateral grooves 26. This enables the lateral grooves 26 to be effectively utilized, namely improving drainage efficiency, compared to configurations in which only the circumferential direction groove 22 is employed for water drainage. This thereby enables any detriment to water drainage from the circumferential direction groove 22 and the lateral grooves 26 (the groove portion 20) to be suppressed.

Second Exemplary Embodiment

Explanation follows regarding a tire 70 according to a second exemplary embodiment as an example of the present disclosure. Note that configuration similar to that in the first exemplary embodiment is allocated the same reference numerals as that in the first exemplary embodiment, and explanation thereof is omitted as appropriate.

Figure 7:
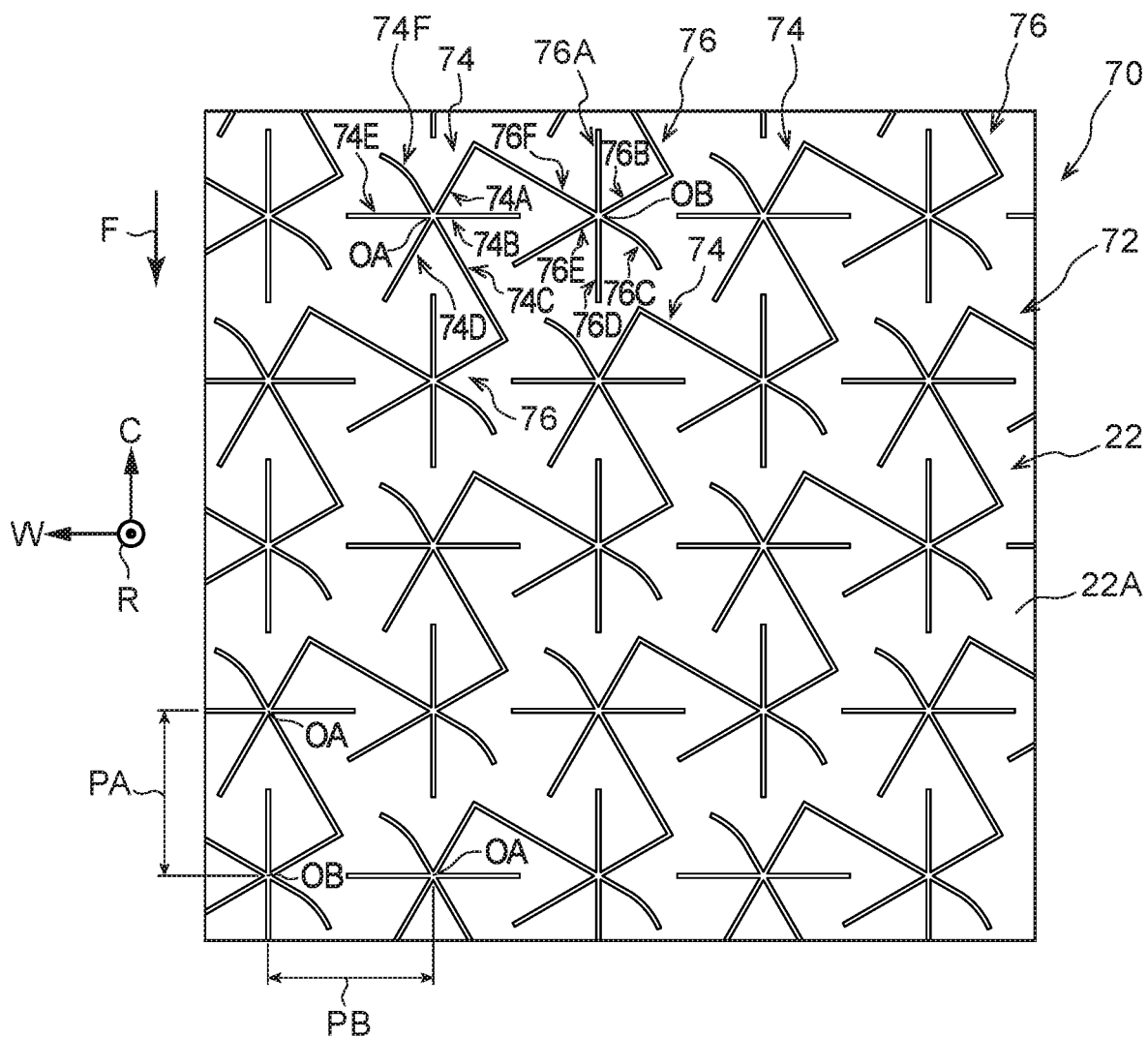
FIG. 7 is a plan view illustrating protrusions on a circumferential direction groove according to a second exemplary embodiment.

FIG. 7 illustrates part of the tire 70 in an enlarged state. Note that protruding portions 72 are formed to the tire 70 instead of the protruding portions 30 (see FIG. 3A), the protruding portions 40 (see FIG. 4A), and the protruding portions 50 (see FIG. 5A) of the tire 10 (see FIG. 1) of the first exemplary embodiment. Configuration other than the protruding portions 72 is similar to the configuration of the tire 10, and so explanation thereof is omitted. Moreover, explanation regarding the protruding portion 72 is given for a protruding portion 72 formed to the groove bottom face 22A of the circumferential direction groove 22, and explanation regarding protruding portions 72 formed to the groove side faces 22B (see FIG. 2A) and protruding portions 72 formed in the lateral grooves 26 (see FIG. 2B) is omitted.

The protruding portion 72 projects out in the R direction from the groove bottom face 22A. The protruding portion 72 includes plural first asterisk protrusions 74 and second asterisk protrusions 76, serving as an example of plural protrusions. As an example, the first asterisk protrusions 74 and the second asterisk protrusions 76 are protrusions configured with the same external appearance and size as each other, but are arranged differently. Specifically, regarding the first asterisk protrusions 74 and the second asterisk protrusions 76, were the first asterisk protrusion 74 to be inverted with line symmetry about a non-illustrated axis of symmetry and then rotated through 90°, the first asterisk protrusion 74 would become a carbon-copy of the second asterisk protrusion 76. The first asterisk protrusions 74 and the second asterisk protrusions 76 are arranged alternately in both the C direction and the W direction.

As an example, when viewed along the R direction, each of the first asterisk protrusions 74 is configured including extension portions 74A, 74B, 74C, 74D, 74E, and 74F extending in different directions to each other in a radial pattern originating from a center OA. As an example, the extension directions of any pair of adjacent extension portions 74A, 74B, 74C, 74D, 74E, and 74F are directions offset by a central angle of 60° about the center OA.

A leading end portion of the extension portion 74A is bent at substantially a right angle with respect to its extension direction. A leading end portion of the extension portion 74F is curved. Each of the extension portions 74B, 74C, 74D, and 74E extends in a straight line. A projection height of the first asterisk protrusions 74 in the R direction from the groove bottom face 22A is a predetermined length of from 0.1 mm to 1.0 mm.

As an example, when viewed along the R direction, each of the second asterisk protrusions 76 is configured including extension portions 76A, 76B, 76C, 76D, 76E, and 76F that extend in different directions to each other in a radial pattern originating from a center OB. As an example, the extension directions of any pair of adjacent extension portions 76A, 76B, 76C, 76D, 76E, and 76F are directions offset by a central angle of 60° about the center OB.

A leading end portion of the extension portion 76B is bent at substantially a right angle with respect to its extension direction. A leading end portion of the extension portion 76C is curved. Each of the extension portions 76A, 76D, 76E, and 76F extends in a straight line. A projection height of the second asterisk protrusions 76 in the R direction from the groove bottom face 22A is a predetermined length of from 0.1 mm to 1.0 mm.

As an example, a leading end of the extension portion 74A is coupled to a leading end of one of the extension portions 76F. As an example, a leading end of the extension portion 74C is coupled to a leading end of one of the extension portions 76B. A C direction spacing PA and a W direction spacing PB between adjacent first asterisk protrusions 74 and second asterisk protrusions 76 are both set to a predetermined length of from 0.1 mm to 1.0 mm. Namely the first asterisk protrusions 74 and the second asterisk protrusions 76 are fine protrusions. The spacing PA and the spacing PB each refer to the spacing between a given center OA and the adjacent centers OB.

Figure 8:
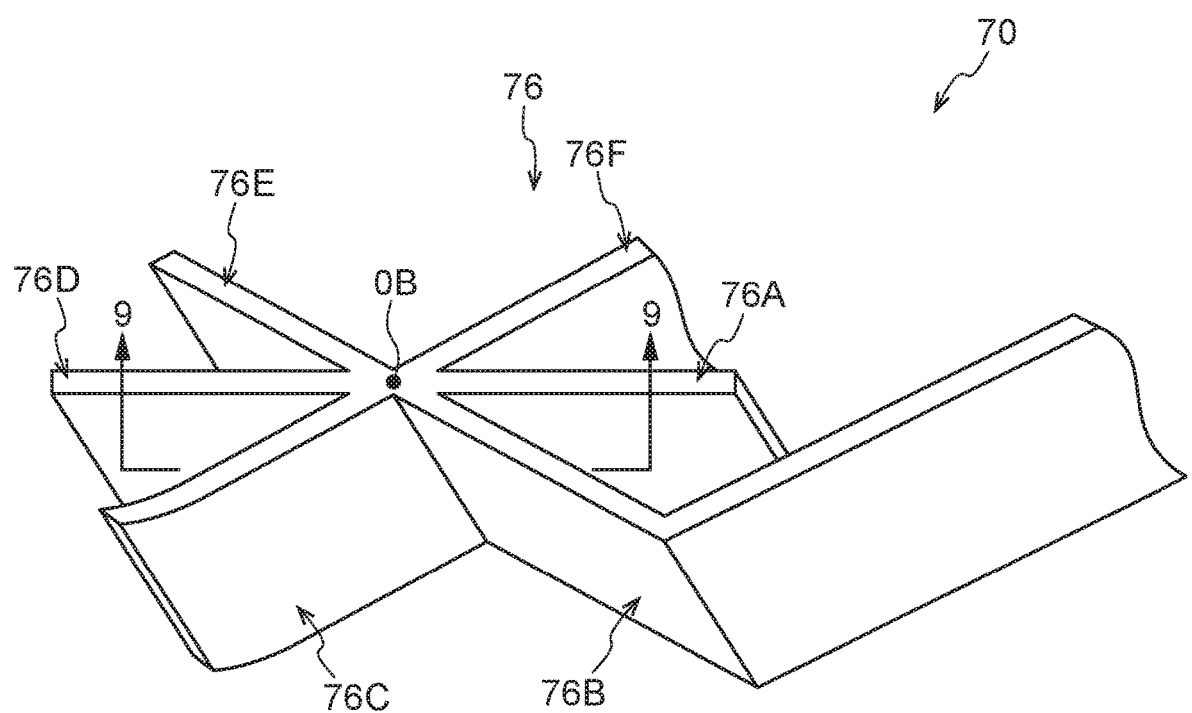
FIG. 8 is an enlarged explanatory diagram illustrating a single protrusion according to the second exemplary embodiment.

FIG. 8 illustrates an example of one of the second asterisk protrusions 76 as viewed obliquely from above. The extension portions 76A, 76B, 76C, 76D, 76E, and 76F of the second asterisk protrusion 76 each lean in a direction intersecting the R direction (see FIG. 7). Similarly, the extension portions 74A, 74B, 74C, 74D, 74E, and 74F (see FIG. 7) of each of the first asterisk protrusions 74 (see FIG. 7) each lean in a direction intersecting the R direction.

Figure 9:
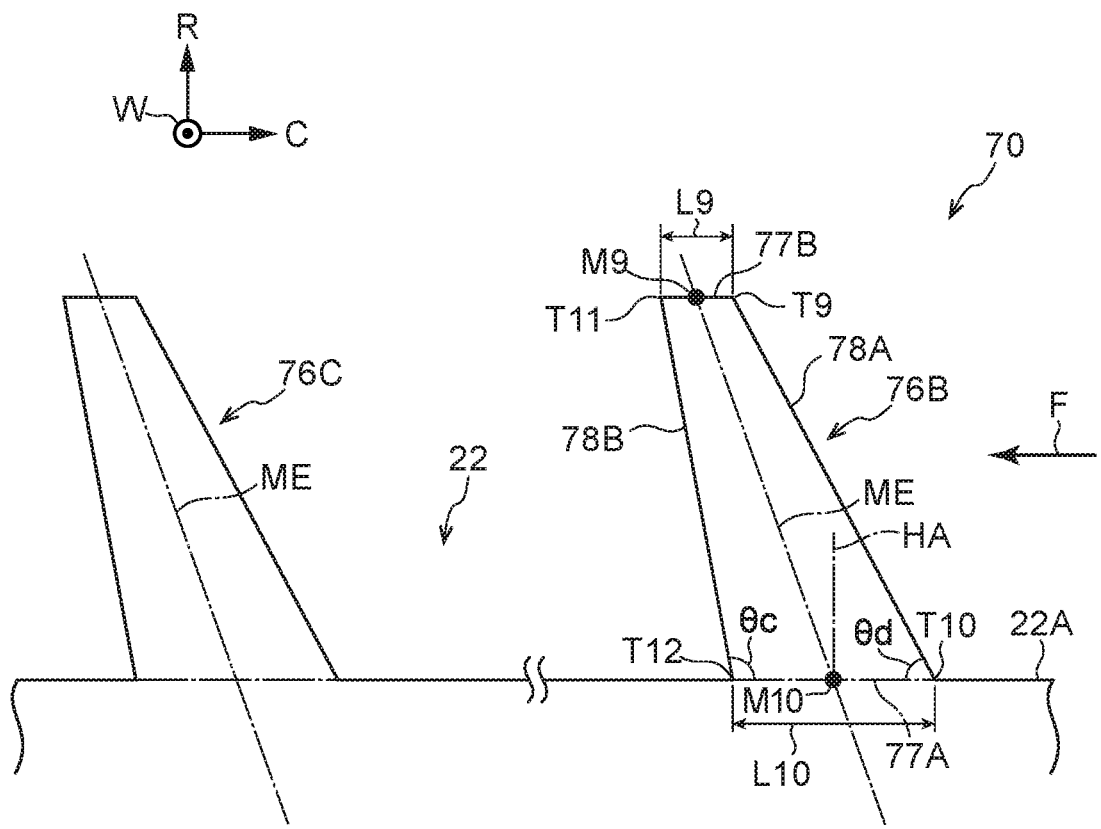
FIG. 9 is an explanatory diagram illustrating a cross-section (sectioned along line 9-9 in FIG. 8) of protrusions according to the second exemplary embodiment.

FIG. 9 is a C-R cross-section illustrating extension direction central portions of the extension portion 76B and the extension portion 76C. As an example, the central portion of the extension portion 76B and the central portion of the extension portion 76C have the same cross-section profile as each other. In other words, the central portion of the extension portion 76B and the central portion of the extension portion 76C lean in the same direction as each other, and would almost align almost perfectly with each other if slid along the C direction. Explanation therefore follows regarding the cross-section of the extension portion 76B, whereas explanation regarding the cross-section of the extension portion 76C will be omitted. Note that the extension portion 76B and the extension portion 76C may have similar cross-section profiles.

When viewed along the W direction, the extension portion 76B has a trapezoidal shaped cross-section profile in a C-R plane. Specifically, the extension portion 76B has a trapezoidal shaped cross-section profile in which a base end (groove bottom face 22A) side configures a lower trapezoid base 77A, a leading end side configures an upper trapezoid base 77B, and the two base angles (internal angles) at either end of the lower trapezoid base 77A are different sizes to each other. A C direction length L9 of the upper trapezoid base 77B is shorter than a length L10 of the lower trapezoid base 77A.

In this cross-section of the extension portion 76B, a base angle θc at the C direction upstream side is an obtuse angle. A base angle θd at the C direction downstream side is an acute angle. In other words, when viewed along the W direction, the extension portion 76B leans such that the leading end side thereof is positioned further toward the C direction upstream side (F direction downstream side) than the base end side thereof. Specifically, a center line ME linking a center point M9 of the upper trapezoid base 77B at the leading end side and a center point M10 of the lower trapezoid base 77A at the base end side leans with respect to an imaginary perpendicular line HA.

When viewed along the W direction, a leading edge T9 of a portion of the extension portion 76B further toward the C direction downstream side than the center line ME is positioned further toward the C direction upstream side than a base edge T10 of the extension portion 76B. Furthermore, a leading edge T11 of a portion of the extension portion 76B further toward the C direction upstream side than the center line ME is positioned further toward the C direction upstream side than a base edge T12 of the extension portion 76B.

In addition thereto, an inclined face 78A that is inclined such that a leading edge T9 side thereof is positioned further toward the C direction upstream side than a base end T10 side thereof is formed at the C direction downstream side of the center line ME of the extension portion 76B. Furthermore, an inclined face 78B that is inclined such that a leading edge T11 side thereof is positioned further toward the C direction upstream side than a base edge T12 side thereof is formed at the C direction upstream side of the center line ME of the extension portion 76B.

An incline angle of the inclined face 78A with respect to the groove bottom face 22A is gentler than an incline angle of the inclined face 78B with respect to the groove bottom face 22A. The inclined face 78A thereby has a function of guiding water flowing toward the inclined face 78A toward the downstream side. The incline angle of the inclined face 78B is steeper than the incline angle of the inclined face 78A. The inclined face 78B thereby has a function of restricting water that has flowed over the inclined face 78A toward the inclined face 78B side from flowing back toward the inclined face 78A side.

Operation and Advantageous Effects

Next, explanation follows regarding operation and advantageous effects of the tire 70 according to the second exemplary embodiment, with reference mainly to FIG. 7 to FIG. 9. Note that reference to individual drawing numbers is omitted.

When the tire 70 rotates, water flows from the F direction upstream side toward the downstream side inside the circumferential direction groove 22 where the tire 70 contacts the wet road surface GL. Some of the water flowing along inside the circumferential direction groove 22 flows toward the plural first asterisk protrusions 74 and second asterisk protrusions 76 projecting out from the groove bottom face 22A.

The plural fine first asterisk protrusions 74 and second asterisk protrusions 76 are formed to the circumferential direction groove 22 of the tire 70, thereby enabling the contrast between the tread face 12 and the circumferential direction groove 22 to be increased compared to in configurations in which these protrusions are not formed. In the tire 70, the leading end sides of each of the plural first asterisk protrusions 74 and second asterisk protrusions 76 are positioned further toward the F direction downstream side than the base end sides thereof. Thus, the flow of water is better suppressed from backing up behind a portion at the upstream side of the center line ME than it would be in configurations in which the leading end side and the base end side of the projecting locations are aligned along the perpendicular line HA that is orthogonal to the groove bottom face 22A, or configurations in which the leading end side is positioned further toward the upstream side than the base end side. Thus, the tire 70 in which the first asterisk protrusions 74 and the second asterisk protrusions 76 are formed in the circumferential direction groove 22 is capable of suppressing any detriment to water drainage from the circumferential direction groove 22.

Note that due to the lean of the center lines ME of each of the first asterisk protrusions 74 and second asterisk protrusions 76, portions of the first asterisk protrusions 74 and second asterisk protrusions 76 at the F direction downstream side of the center lines ME cover part of the groove bottom face 22A when viewed along the R direction. This suppresses light reflection by the first asterisk protrusions 74 and the second asterisk protrusions 76, making the circumferential direction groove 22 appear closer to black (enabling the contrast between the tread face 12 and the circumferential direction groove 22 to be increased).

Furthermore, in the tire 70, at portions of each of the first asterisk protrusions 74 and second asterisk protrusions 76 both further toward both the C direction upstream side and downstream side than the center lines ME, the leading ends are positioned further toward the C direction upstream side than the corresponding base ends. Thus, at the portions of the first asterisk protrusions 74 and the second asterisk protrusions 76 further toward the C direction upstream side than the center lines ME, part of the groove bottom face 22A of the circumferential direction groove 22 can be easily covered by the protrusions 32 when viewed from the R direction outside, thereby lowering the brightness comparative to the brightness of other regions where light is simply reflected. Less light is reflected along the R direction than is reflected in directions other than the R direction. Thus, the groove appears black when the circumferential direction groove 22 is viewed from the R direction outside. Namely, the contrast between the tread face 12 and the circumferential direction groove 22 can be increased.

Furthermore, the inclined face 78A is respectively formed at the F direction upstream side of each of the first asterisk protrusions 74 and second asterisk protrusions 76 inside the circumferential direction groove 22 of the tire 70. The inclined face 78A is inclined such that the leading end side thereof is positioned further toward the F direction downstream side than the base end side thereof. Thus, the flow of water contacting the first asterisk protrusions 74 and the second asterisk protrusions 76 is less liable to be suppressed than it would be in configurations in which upstream side faces of the first asterisk protrusions 74 and the second asterisk protrusions 76 are uneven faces. This enables any detriment to water drainage from the circumferential direction groove 22 to be suppressed.

First Modified Example

Figure 2C:
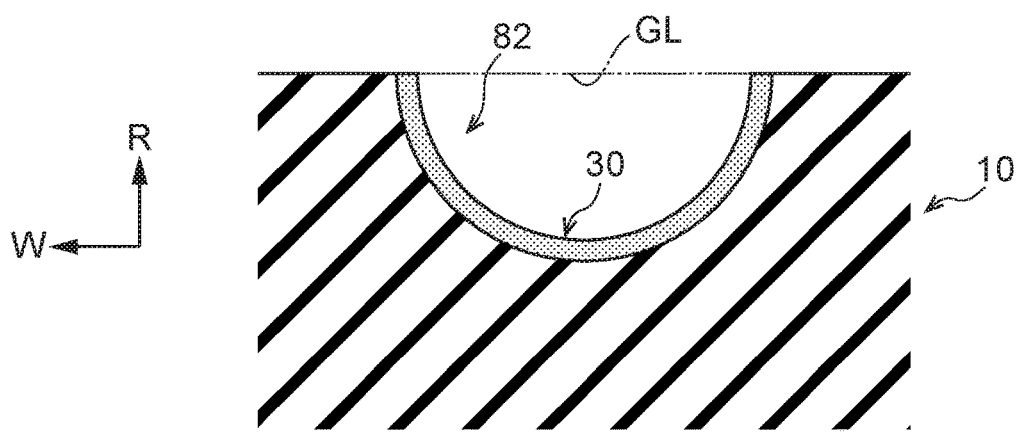
FIG. 2C is a vertical cross-section of a circumferential direction groove of a tire according to a first modified example.

FIG. 2C illustrates a first modified example in which a circumferential direction groove 82 has a semicircular cross-section profile in a W-R plane of the tire 10 (see FIG. 1). The first protruding portion 30 is formed to the circumferential direction groove 82. The first protruding portion 30 may thus be formed to the circumferential direction groove 82 in which a groove bottom face and groove side faces are linked to form a smooth curved face. The lateral grooves 26 (see FIG. 2B) may also have semicircular cross-section profiles.

Second Modified Example

Figure 10A:
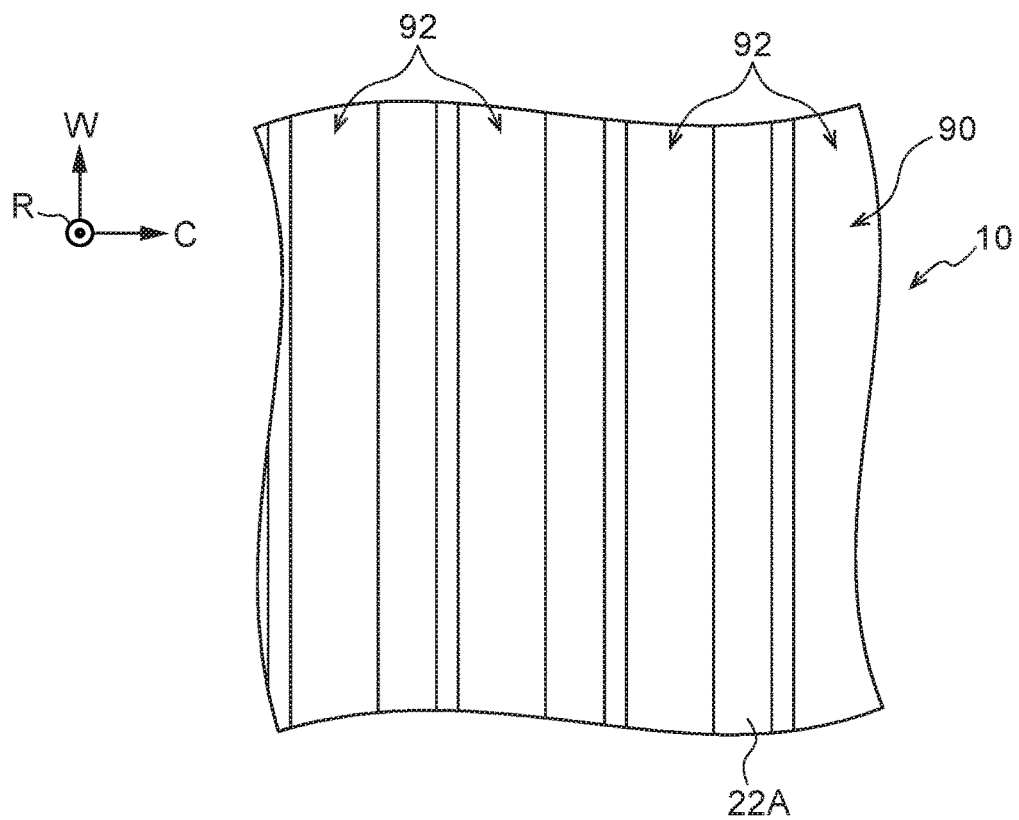
FIG. 10A is a plan view illustrating protrusions according to a second modified example.

FIG. 10A illustrates a second modified example in which a first protruding portion 90 is formed to the tire 10 instead of the first protruding portion 30 (see FIG. 3A). The first protruding portion 90 includes plural protrusions 92. The protrusions 92 have a configuration achieved by linking together and integrating the protrusions 32 (see FIG. 3A) along the W direction. Note that the spacing along the C direction is unchanged. As this demonstrates, the protrusions are not limited to being discrete island-like features, and may form elongated shapes in the W direction.

Third Modified Example

Figure 10B:
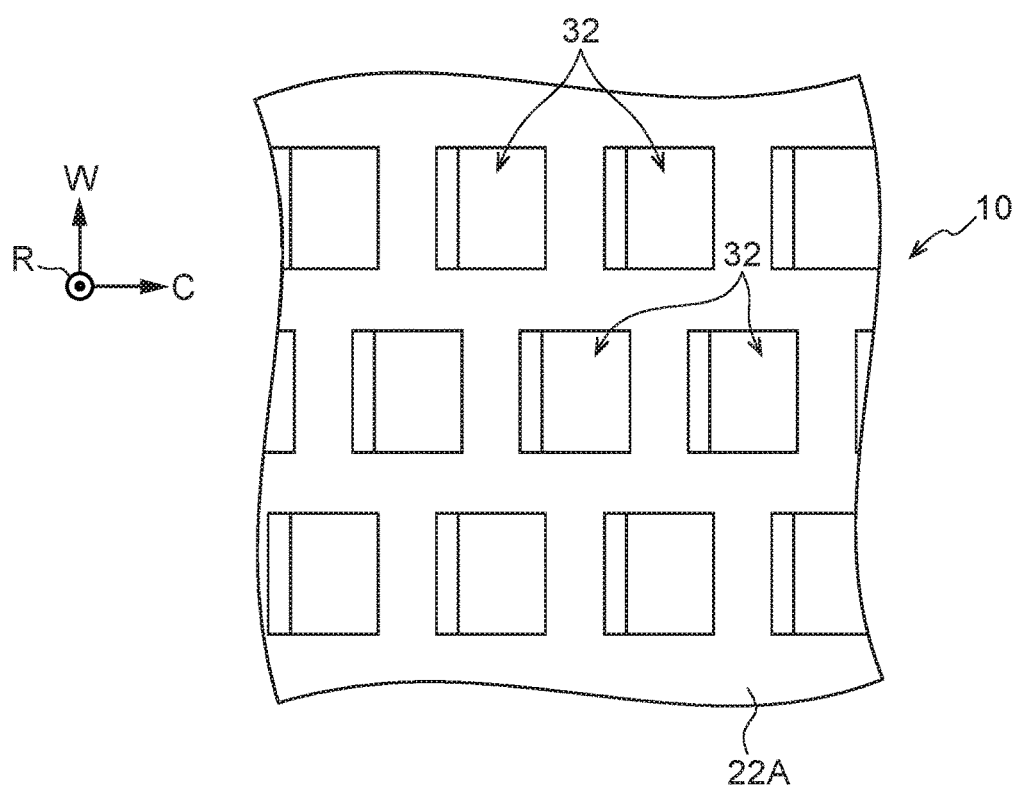
FIG. 10B is a plan view illustrating protrusions according to a third modified example.

FIG. 10B illustrates a third modified example in which plural protrusions 32 are arranged in a staggered pattern in the C direction and the W direction of the tire 10. As this demonstrates, the arrangement of the plural protrusions (including protrusions other than the protrusions 32) is not limited to a matrix pattern arrangement, and other arrangements may be applied.

Fourth Modified Example

Figure 11:
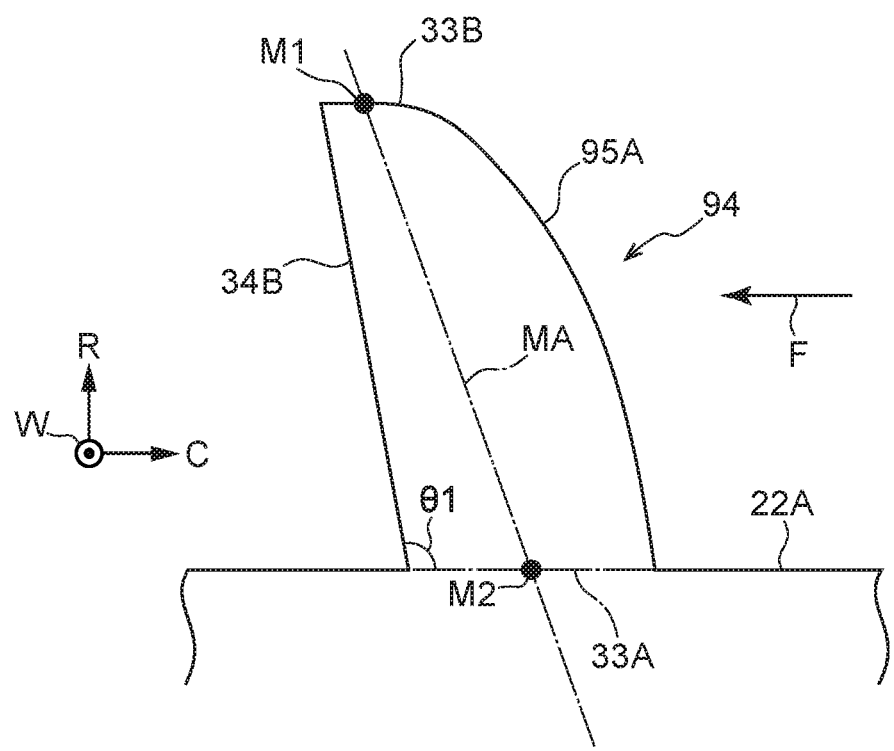
FIG. 11 is an explanatory diagram illustrating a protrusion according to a fourth modified example.

FIG. 11 illustrates a protrusion 94 of a fourth modified example. The protrusion 94 has a configuration achieved by forming the protrusion 32 (see FIG. 3B) with a curved face 95A instead of the inclined face 34A (see FIG. 3B). The curved face 95A has a convex profile protruding toward the F direction upstream side. As this demonstrates, a face formed to the protrusion is not limited to a flat planar face (inclined face), and a convex or concave curving face may be applied.

Other Modified Examples

A configuration may be applied in which the lateral grooves 26 are not formed, and only the circumferential direction groove 22 is formed to the tire 10. Alternatively, a configuration may be applied in which the plural protrusions 32 are only formed to the circumferential direction groove 22, and the plural protrusions 32 are not formed in the lateral grooves 26. Furthermore, the plural protrusions 32, 42 may have the same or different incline angles to each other at the groove bottom faces 22A and the groove side faces 22B. In addition, the plural protrusions 32, 42 may have different R direction heights from the groove bottom faces 22A and the groove side faces 22B. Moreover, a configuration may be applied in which the plural protrusions 62 including the inclined faces 64A are not formed to the tire 10.

In the tire 70, the incline angles of the first asterisk protrusions 74 and the second asterisk protrusions 76 in the lateral grooves 26 may be gentler than the incline angles of the first asterisk protrusions 74 and the second asterisk protrusions 76 in the circumferential direction groove 22. Moreover, the protrusions 62 including the inclined faces 64A may be formed at the connecting portions 60 of the tire 70. The guiding faces are not limited to flat planar faces such as the inclined faces 64A, and convex or concave curving faces may be employed.

Tires according to various exemplary embodiments and various modified examples of the present invention have been described above. Obviously these various exemplary embodiments and various modified examples may be employed in appropriate combinations, and various embodiments may be implemented within a range not departing from the spirit of the present invention.

The entire content of the disclosure of Japanese Patent Application No. 2018-118162 filed on Jun. 21, 2018 is incorporated by reference in the present specification.

All cited documents, patent applications, and technical standards mentioned in the present specification are incorporated by reference in the present specification to the same extent as if each individual cited document, patent application, or technical standard was specifically and individually indicated to be incorporated by reference.

The invention claimed is:

1. A tire, comprising:
a groove that is formed in a tread face so as to open toward an outer side in a tire radial direction; and
a plurality of protrusions that are formed on a surface of the groove so as to project to a projection height of from 0.1 mm to 1.0 mm, at a spacing of from 0.1 mm to 1.0 mm, a center line linking a center point of a leading end side with a center point of a base end side of the respective protrusions leaning with respect to a perpendicular line orthogonal to a surface of the groove, such that the leading end side of the each protrusion is positioned further toward a tire rotation direction upstream side than the base end side of the protrusion when viewed along a tire width direction or the tire radial direction; wherein
an inclined face is formed at a tire rotation direction downstream side of the center line of each of the protrusions and is inclined such that the leading end side is positioned further toward the tire rotation direction upstream side than the base end side;
the groove includes a circumferential direction groove extending along the tire rotation direction, and a lateral groove extending from the circumferential direction groove along an intersecting direction that intersects the tire rotation direction;
protrusions of the plurality of protrusions in the lateral groove have inclined surfaces arranged at a first incline angle of inclination with respect to the surface, and protrusions of the plurality of protrusions in the circumferential direction groove have inclined surfaces arranged at a second incline angle of inclination with respect to the surface;
the first incline angle is smaller than the second incline angle;
one end portion of the lateral groove opens onto the circumferential direction groove;
a guide face, configured to guide a part of water flowing in the circumferential direction groove toward the lateral groove, is formed at protrusions of the plurality of protrusions that are disposed at a connecting location between the circumferential direction groove and the lateral groove; and
each protrusion provided at the connecting location is formed across a groove bottom face of the circumferential direction groove and a groove bottom face of the lateral groove, and when viewed from the tire radial direction, the width of each protrusion provided at the connecting location in the tire width direction is shorter than the width in the tire width direction of other protrusions of the plurality of protrusions, and the height of each protrusion provided at the connection location in the tire radial direction is higher than the height in the tire radial direction of other protrusions of the plurality of protrusions.

2. The tire of claim 1, wherein, when viewing each of the protrusions along the tire width direction, a leading end of a first portion of the protrusion that is further toward the tire rotation direction upstream side than the center line is positioned further toward the tire rotation direction upstream side than a base end of the first portion, and a leading end of a second portion of the protrusion that is further toward a tire rotation direction downstream side than the center line is positioned further toward the tire rotation direction upstream side than a base end of the second portion.

3. The tire of claim 1, wherein:
the circumferential direction groove is formed with an inverted trapezoidal shaped cross-section profile when viewed in a cross-section that is sectioned orthogonally to a groove length direction,
the lateral groove is formed with a quadrilateral cross-section profile when viewed in a cross-section that is sectioned orthogonally to a groove length direction, the plurality of protrusions include:
a plurality of first protrusions projecting from the surface of the circumferential direction groove;
a plurality of second protrusions projecting from the surface of the lateral groove; and
a plurality of third protrusions disposed at a connecting location between the circumferential direction groove and the lateral groove, and
the height of the plurality of second protrusions in the tire radial direction is lower than the height in the tire radial direction of the plurality of first protrusions, and
the height of the plurality of third protrusions in the tire radial direction is higher than the height in the tire radial direction of the plurality of first protrusions and the plurality of second protrusions.

* * * * *